United States Patent Office 3,140,392
Patented July 7, 1964

3,140,392
LOW FREQUENCY FUNCTION GENERATOR
Morton Losher, Bergenfield, N.J.
(700 Fort Washington Ave., New York, N.Y.)
Filed Aug. 25, 1960, Ser. No. 53,581
10 Claims. (Cl. 235—197)

This application is a continuation-in-part of patent application Serial No. 792,009, now abandoned, filed February 9, 1959.

The present invention relates to low frequency function generators. Generators of this type are useful for instance in connection with analog computing processes where it is desirable to be in a position of generating a wide range of complex repetitive waveforms. As is well known, waveforms of this type can be represented mathematically by Fourier series. Therefore, the purpose of the generator according to this invention is to generate the sine and cosine terms of the Fourier series of a desired waveform. By combining these terms in proportion to the required relative values of the Fourier coefficients one may synthesize the required wide range of complex repetitive waveforms.

Low frequency function generators as known have been found not to operate with sufficient accuracy, particularly if a rather large number of higher harmonics are required.

It is therefore a main object of the present invention to provide a method and apparatus for generating complex repetitive waveforms of the type set forth with great accuracy and by means of a comparatively simple equipment.

It is an object of the present invention to provide a method and apparatus for generating complex waveforms as a function of an independent variable with great accuracy and by means of comparatively simple equipment.

With the above objects in view, a method of generating complex repetitive waveforms according to the invention mainly consists in the steps of resolving a primary sinusoidal voltage of the form $v=v \sin(\omega t_c + \phi_c)$ into component voltages $kv \sin \theta$ and $kv \cos \theta$, wherein $k$ is the transformation ratio of the resolving means; introducing into said component voltages a constant frequency $\omega$ in such a manner that modulated voltages in the form of Fourier components $kv \sin(\omega t + \phi)$ and $kv \cos(\omega t + \phi)$, respectively, are obtained, wherein $\phi$ is an arbitrary phase angle; introducing, in $n-1$ consecutive steps, wherein $n$ is an integer at least equal to 2, into said Fourier components at each step, a constant frequency $m\omega$, wherein $m$ is a positive number, in such a manner that after $n-1$ steps modulated output voltages of the Fourier component form $kv \sin(nm\omega t + \phi)$ and $kv \cos(nm\omega t + \phi)$ respectively, are obtained; summing up the desired number of associated modulated Fourier components individually obtained from a corresponding number of said consecutive steps and adding thereto said unmodulated carrier voltage $v=v \sin(\omega_c t + \phi_c)$ so as to obtain a complex repetitive modulated waveform; and demodulating the said complex repetitive modulated waveform so as to obtain a demodulated wave containing the desired number of harmonics.

In another aspect of the invention, an apparatus for generating complex repetitive waveforms, mainly comprises first resolver means being capable of resolving an input carrier voltage of the sinusoidal form $v=v \sin(\omega_c t + \phi_c)$ into output voltages $kv \sin \theta$ and $kv \cos \theta$, wherein $k$ is the transformation ratio of the resolver means: $n-1$ resolver means are operatively connected in series with the first resolver means, $n$ being an integer at least equal to 2. Means is provided for introducing into each of the first and $n-1$ resolver means a predetermined constant modulation frequency $m\omega$, $m$ being equal to 1 for the first resolver means and being a positive integer larger than 1 for the other resolver means, in such a manner that the output voltages of the $n-1$ resolver means are modulated each to the form $kv \sin(zm\omega t + \phi)$ and $kv \cos(zm\omega t + \phi)$, respectively, wherein $z$ changes between consecutive resolver means by integers between 2 and $n$, $\phi$ being an arbitrary phase angle. Intermediate means is interposed between the first resolver means and the first one of the $n-1$ resolver means, as well as between each two consecutive ones of the $n-1$ resolver means, for transmitting the output voltages respectively from one resolver means to the next following one and including output means. Summing means is connected to the output means of the intermediate means for summing up a desired number of the modulated output voltages obtained from a corresponding number of the resolver means through the output means of the respective intermediate means, and for adding thereto, the unmodulated input carrier voltage so as to obtain a complex repetitive modulated waveform. Demodulator means is connected to the summing means for demodulating the complex repetitive modulated waveform so as to obtain a demodulated wave containing the desired number of harmonics.

In still another aspect of the invention, an apparatus for generating complex waveforms as a function of an independent variable, comprises first resolver means being capable of resolving an input carrier voltage of the sinusoidal form $v=v \sin(\omega_c t + \phi_c)$ into output voltages $kv \sin \theta$ and $kv \cos \theta$, wherein $k$ is the transformation ratio into the resolver means. $n-1$ resolver means are operatively connected in series with the first resolver means, $n$ being an integer at least equal to 2. Means is provided for introducing into each of the first and $n-1$ resolver means a predetermined angular position $m\phi$ as a function of an independent variable, $m$ being a positive number, in such a manner that the output voltages of the $n-1$ resolver means are modulated each to the form $kv \sin(zm\phi)$ and $kv \cos(zm\phi)$, respectively, wherein $z$ changes between consecutive resolver means by integers between 2 and $n$, $\phi$ being the angular position of the first resolver means. Intermediate means is interposed between the first resolver means and the first one of the $n-1$ resolver means, as well as between each two consecutive ones of the $n-1$ resolver means, respectively, for transmitting the output voltages respectively from one resolver means to the next following one, and including output means. Summing means is connected to the output means of the intermediate means for summing up a desired number of the modulated output voltages obtained from a corresponding number of the resolver means through the output means of the respective intermediate means, and for adding thereto the unmodulated input carrier voltage so as to obtain a complex modulated waveform. Demodulator means is connected to the summing means for demodulating the complex waveform so as to obtain a demodulated wave having the desired waveform.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Before entering into a detailed description of the drawings it is to be understood that the illustrated arrangement is only a preferred embodiment of an apparatus according to the invention. Other arrangements serving the same purpose may be conceived by those skilled in the art on the basis of the principle of the method according to the invention. However, the description of the operation and function of the embodiment illustrated in FIGS. 1 to 3 and the modification illustrated in FIG. 1A will sufficiently reveal the various steps of the method according to the invention so that a separate description of the method appears not to be needed.

While the objects of the invention have been described as being a method and apparatus for generating complex repetitive waveforms and for generating complex waveforms as a function of an independent variable, this terminology should not be interpreted in a strictly narrow sense because the desired waveform need not necessarily be repetitive in nature since the device will generate waveforms of a periodicity extending to infinity. There are only two limitations, as will become apparent from the following discussion of the operation of the apparatus. These limitations are the number of harmonics which can be generated and the upper limit of the fundamental modulating frequency. These limitations depend, on the one hand, on the expense involved in fabricating a generator, i.e., on the number of units generating the individual harmonics. However, it has been found that at least 20 harmonics can be produced conveniently using precision components without obtaining disturbed results due to the introduction of noise. On the other hand, it has been found that a fundamental modulating frequency above 40 c.p.s. yields satisfactory results.

Figure 1:
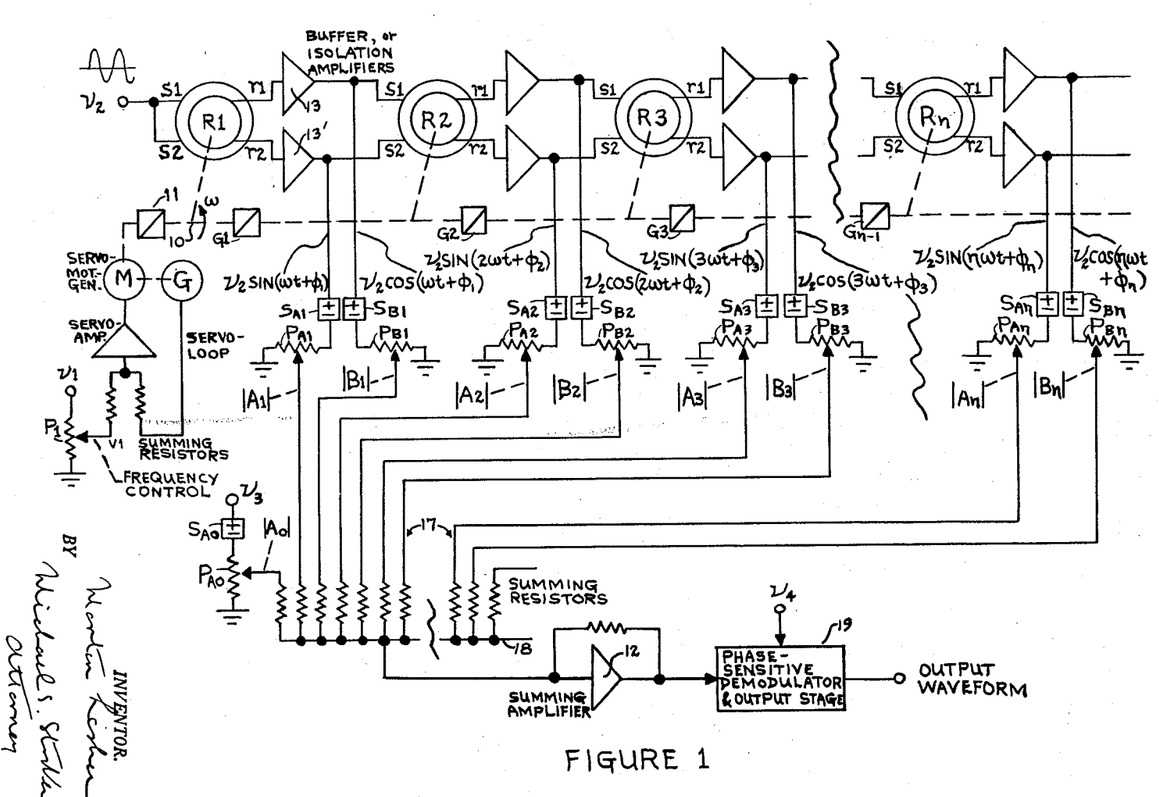
FIG. 1 is a general schematic diagram of an embodiment of apparatus according to the invention.

Referring now to FIG. 1, a number of sine-cosine resolvers of conventional type are arranged in a series. Resolvers of a suitable type are described, for example, in the "Resolver Handbook," published by the Reeves Instrument Corporation in New York, New York, Bulletin No. 57, published 1954, particularly the item illustrated on page 5 thereof, FIG. 3. Resolvers of this type have a pair of rotor windings. All the rotors of all the resolvers $R1, R2, R3 \ldots Rn$ are mechanically coupled together by being driven by a common shaft 10, which fact is diagrammatically illustrated in FIG. 1 by a dotted line with branches leading toward the centers of the individual resolver $R1 \ldots Rn$. The shaft 10 is driven by a motor M through a gear reduction 11 at a uniform rotary speed $\omega$ so that all the rotors of all the resolvers are rotated at approximately the same speed. The motor M is connected with a circuit that may be called a "servo-loop" of conventional type, this arrangement comprising a generator G coupled with the motor M, a servo-amplifier, summing resistors and a frequency control P1 so that an operating voltage $v_1$ derived from input voltage $v$, can be applied in the desired manner to drive the motor M at a selected speed.

If a sinusoidal carrier voltage $v_2 = v_2 \sin(\omega_c t + \phi_c)$ is applied to the stator terminals $s1$ and $s2$ (or even only to one of them) of the resolver R1 which may be called the fundamental resolver, output voltages $v_2 \sin \theta$ and $v_2 \cos \theta$ are generated on the rotors of the resolver R1 so as to become available at the rotor output terminals $r1$ and $r2$, respectively. This statement is based on the assumption that the transformation ratio $k$ of the resolver is 1:1, but if this ratio is different, means will be described to rectify the situation. Due to the fact that the rotor shaft is rotated at the rotary constant speed $\omega$ of the main shaft 10, the rotor output voltages are $v_2 \sin(\omega t + \phi_1)$ and $v_2 \cos(\omega t + \phi_1)$ wherein $\phi_1$ is an arbitrary rotor phase angle. These two output voltages are then applied to the stator terminals $s1$ and $s2$ of the next succeeding resolver R2, however, suitable impedance transformer means are interposed between the rotor terminals of resolver R1 and the stator terminals of the resolver R2. Impedance transformer means are conventional, nevertheless a preferred form will be described further below with reference to FIG. 2.

It will be understood that the just-mentioned two output voltages produce within the resolver R2 a flux vector rotating with a speed of $\omega$, the rotation taking place in a direction opposite to that of the rotor of this resolver. In certain resolvers it cannot be predetermined in which manner or with which polarities the rotor windings of the first resolver are to be connected with the stators of the second resolver in order to bring about the desired direction of flux vector rotation. Therefore, the diagram only schematically indicates that one terminal $r1$ of one resolver is connected with a terminal $s1$ of the next resolver and the respective terminal $r2$ with the respective terminal $s2$. It may be necessary, if the rotation of the flux vector is in the wrong direction, to cross the connection so as to obtain the correct polarity. If the connections are correct, the rotor windings connected to terminals $r1$ and $r2$ of the resolver R2 will, in principle, generate sine and cosine voltage components at a frequency which is the sum $2\omega$ of the rotation velocity of the shaft 10 of the rotors, namely $\omega$, and the flux vector velocity of rotation which is in the case of the resolver R2 also $\omega$. Consequently, the output voltage of the second resolver R2 is a modulated output voltage $v_2 \sin(2\omega t + \phi_2)$ and a modulated output voltage $v_2 \cos(2\omega t + \phi_2)$, respectively. As in the case of the resolver R1, $\phi_2$ is an arbitrary phase angle.

As a next step, the last-mentioned output voltages of the resolver R2 are applied, via impedance transformer means of the same type as used between the first two resolvers, to the stators of the following resolver R3. Again, if the correct polarity is chosen in the connections between the resolvers, these output voltages of R2 will produce within the resolver R3 another flux vector rotating at a speed $2\omega$ in a direction opposite to that of the rotor. Consequently, the rotor windings connected to terminals $r1$ and $r2$ of the resolver R3 will generate sine and cosine voltages at a frequency which is the sum $3\omega$ of the shaft velocity $\omega$ and the flux vector velocity $2\omega$. The output voltages of the resolver R3 are thus $$v_2 \sin(3\omega t + \phi_3)$$

and $$v_2 \cos(3\omega t + \phi_3)$$

respectively, wherein $\phi_3$ is an arbitrary phase angle. The remaining resolvers of the series thereof are operated in exactly the same manner and interconnected in the same manner as described above. Therefore, the above-described step between the resolvers R2 and R3 is repeated indefinitely, going from one resolver to the next, until a large number of harmonic terms have been accumulated. The number of harmonics thus generated depends only upon the number of resolvers used in the series thereof. It can be seen that the principle of the invention resides in the fact that each resolver generates sine and cosine voltages of the next higher frequency in the harmonic series, as compared with the output voltages of the preceding resolver, while, in general, the rotors of said resolvers all rotate at the fundamental frequency, $\omega$.

Care must be taken to maintain a constant peak voltage along the whole sequence of output voltages of individual resolvers. Since some resolvers have a transformation ratio greater than 1:1 and other resolvers may have a ratio smaller than 1:1, auxiliary means should be provided for adjusting the output voltages in order to compensate for possible gain or loss in the transformation. Such auxiliary means are entirely conventional.

It is also obviously necessary to maintain absolute phase-coherence between the individual consecutive output voltages which constitute the frequency terms in the harmonic series according to a Fourier series. This condition is evidently most satisfactorily met by the fact that all rotors of all the resolvers are mechanically coupled together and driven by the common shaft 10.

The output voltages of the resolvers are in a modulated form. If the number of resolvers in those series is extended sufficiently, ultimately the frequency of the output voltages generated by the resolvers would tend to approach the frequency of the carrier voltage. Therefore, the carrier frequency must be chosen to be at least 10 times higher than the highest harmonic frequency of interest in order to avoid subsequent phase shift and attenuation of the demodulated harmonic.

Referring again to FIG. 1, the above-mentioned output voltages of the individual resolvers are applied to potentiometers $P_{A1}$, $P_{B1}$ ... $P_{An}$, $P_{Bn}$, via polarity reversing switches $S_{A1}$, $S_{B1}$ ... $S_{An}$, $S_{Bn}$ and from there to a mixing or summing amplifier 12. The purpose and function of the just-mentioned potentiometers is to control the voltage amplitude of the individual output voltages so that thereby the proportion in which the individual harmonic signals are mixed corresponds to the magnitude of the Fourier coefficient terms $A_1$, $B_1$, $A_2$, $B_2$ ... $A_n$, $B_n$. In this manner, the amplitude ratio between the individual harmonic components of the desired waveform can be easily adjusted.

As has been stated above, care must be taken to phase the rotors of all the resolvers with respect to one another in such a manner that the arbitrary phase angles $\phi_1$, $\phi_2$ ... $\phi_n$ are all equal to each other as measured from some mechanical reference point.

In addition, the sign or polarity of each term, once it is determined what is required, may be obtained by the above-mentioned + or − selector switches $S_{A1}$, $S_{B1}$, etc. respectively associated with each resolver output. The function of these reversing switches is essentially to reverse the phase of the particular harmonic term by 180°.

Figure 1A:
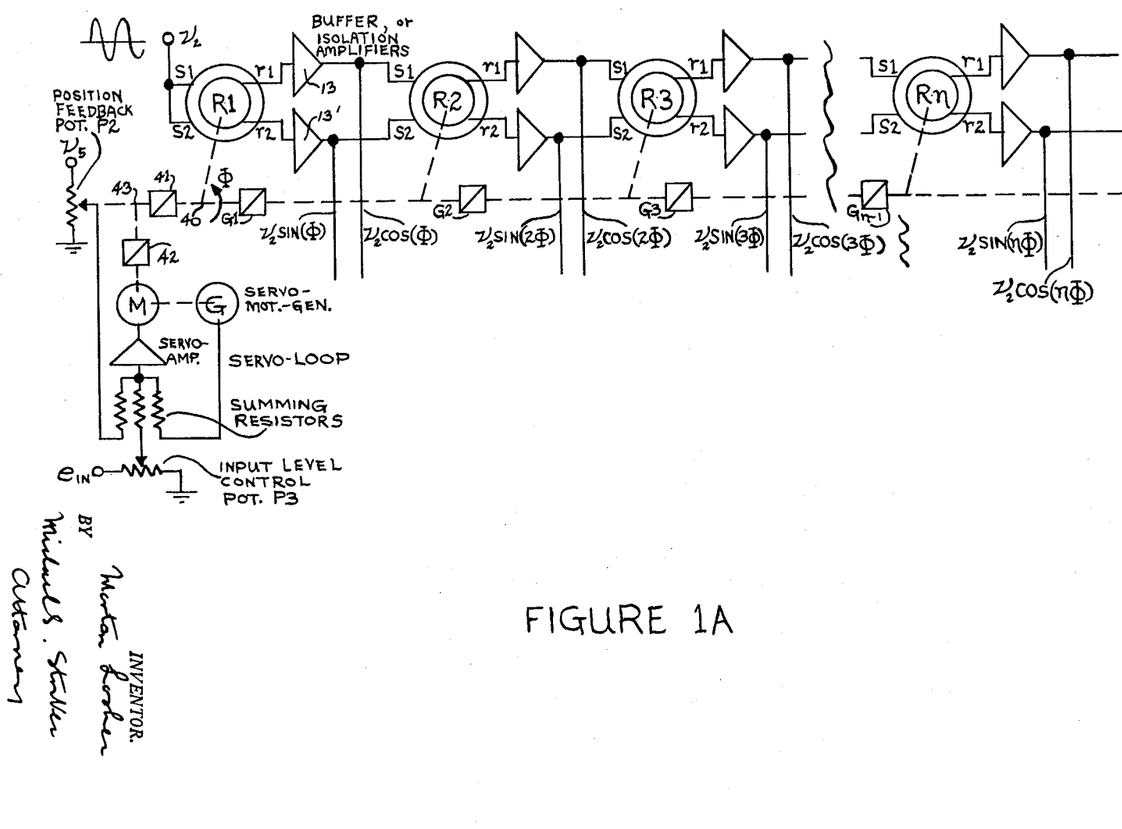
FIG. 1A is a partial schematic diagram of a modification of the embodiment of FIG. 1.

FIG. 1A illustrates a modification of the embodiment of FIG. 1. In the modification of FIG. 1A substantially the same components are utilized as in the circuit arrangement of FIG. 1; the difference between the arrangement of FIGS. 1 and 1A being that in the arrangement of FIG. 1 the common shaft 10 is driven by the motor M at a uniform rotary speed $\omega$, whereas in the arrangement of FIG. 1A the common shaft 40 driving the resolver rotors is turned through a desired angle by the motor M. The fact that the common drive shaft 40 is turned through a desired angle $\phi$, rather than being rotated at a uniform rotary speed, enables the arrangement of FIG. 1A to function as a generator of complex waveforms as a function of an independent variable. The motor M is connected in an angular position servo-loop comprising the generator G coupled with said motor, a servo-amplifier, a position feedback potentiometer control P2 so that a voltage $v_5$ derived from an input or reference voltage $v_5$, and controlled by the position of the shaft 40 by a coupling 43, can be derived, summing resistors and an input level control potentiometer P3 so that an independent input voltage $e_{in}$ may be varied independently and applied in the desired manner to turn the said motor to a desired angular position.

The angular position of the shaft 40 is determined by the magnitude of the input voltage $e_{in}$ and the input level control potentiometer P3 setting, as well as the value of the gear ratio 41. This is due to the fact that the position feedback potentiometer P2 derives a signal voltage proportional to the actual angular position $\phi$ of the shaft 40 and said signal voltage is compared with a signal derived from the input level control potentiometer P3. The difference between these signals, which depends upon the value of the voltage $v_5$ and the independent input voltage $e_{in}$, is used as an error signal in a conventional manner involving the servo-amplifier, servo-motor and gear train 42 for correcting the value of the angular position $\phi$ until the error is reduced to substantially zero. By using conventional compensation techniques, for example velocity feedback as furnished by the generator G, it is possible to control the angular position $\phi$ of the shaft 40 to be accurately a linear function of the magnitude of the input signal $e_{in}$ over a wide frequency bandwidth of said input signal. The setting of the input level control potentiometer P3, the relative values of the summing resistors, the magnitude of the input or reference voltage $v_5$ and the gear ratio 41 all establish the change of angular position of the shaft 40, for a given change in the input voltage $e_{in}$.

Thus, since the angular position $\phi$ of the shaft 40 is a function of the input voltage $e_{in}$ and the output waveform depends upon said angular position, $\omega$ is zero since the shaft has no velocity, the arrangement of FIG. 1A produces a complex waveform having a steady state value which is a function of the input voltage magnitude $e_{in}$.

If a sinusoidal carrier voltage $v_2 = v_2 \sin(\omega_c t + \phi_c)$ is applied to the stator terminals $s1$ and $s2$ (or even only to one of them) of the resolver R1, output voltages $v_2 \sin \theta$ and $v_2 \cos \theta$ are generated on the rotor of the resolver R1 so as to become available at the rotor output terminals $r1$ and $r2$, respectively. This is based on the assumption that the transformation ratio $k$ of the resolver is 1:1. Due to the fact that the rotor shaft of the first resolver is turned to the angular position $\phi$ of the main shaft 40, the rotor output voltages are $v_2 \sin \phi$ and $v_2 \cos \phi$, wherein $\phi$ is the angular position of the first resolver determined as a function of the independent variable $e_{in}$. These two output voltages are then applied to the stator terminals $s1$ and $s2$ of the next succeeding resolver R2, suitable impedance transformer means being interposed between the rotor terminals of resolver R1 and the stator terminals of the resolver R2.

If the connections between the resolvers are correct, the rotor windings connected to terminals $r1$ and $r2$ of the resolver R2 will, in principle, generate sine and cosine voltage components at a frequency which is the sum $2\phi$ of the angular position of the rotor of the first resolver R1, namely $\phi$. Consequently, the output voltage of the second resolver R2 is a modulated output voltage $v_2 \sin 2\phi$ and a modulated voltage $v_2 \cos 2\phi$, respectively. As in the case of the resolver R1, $\phi$ is the angular position of the first resolver rotor.

The last-mentioned output voltages of the resolver R2 are applied, via impedance transformer means of the same type as used between the first two resolvers, to the stators of the following resolver R3. If the correct polarity is chosen in the connections between the resolvers, these output voltages of R2 will generate in the resolver R3 sine and cosine voltages at a frequency which is the sum $3\phi$ of the angular position of the rotor of the first resolver R1, namely $\phi$. The output voltages of the resolver R3 are thus $v_2 \sin 3\phi$ and $v_2 \cos 3\phi$, respectively. The remaining resolvers of the series are operated in exactly the same manner and interconnected in the same manner as described. Therefore, the described step between the resolvers R2 and R3 is repeated indefinitely, going from one resolver to the next, until a large number of terms have been accumulated. The number of terms thus generated depends only upon the number of resolvers used in the series. It can be seen that the principle of the invention resides in the fact that each resolver generates sine and cosine voltages of the next higher frequency in the series, as compared with the output voltages of the next-preceding resolver, while in general, the rotors of said resolvers all are positioned at the angular position $\phi$.

The aforementioned output voltages of the individual resolvers are applied to potentiometers $P_{A1}$, $P_{B1}$ ... $P_{An}$, $P_{Bn}$ and from there to a mixing or summing amplifier 12, as shown in FIG. 1.

Figure 2:
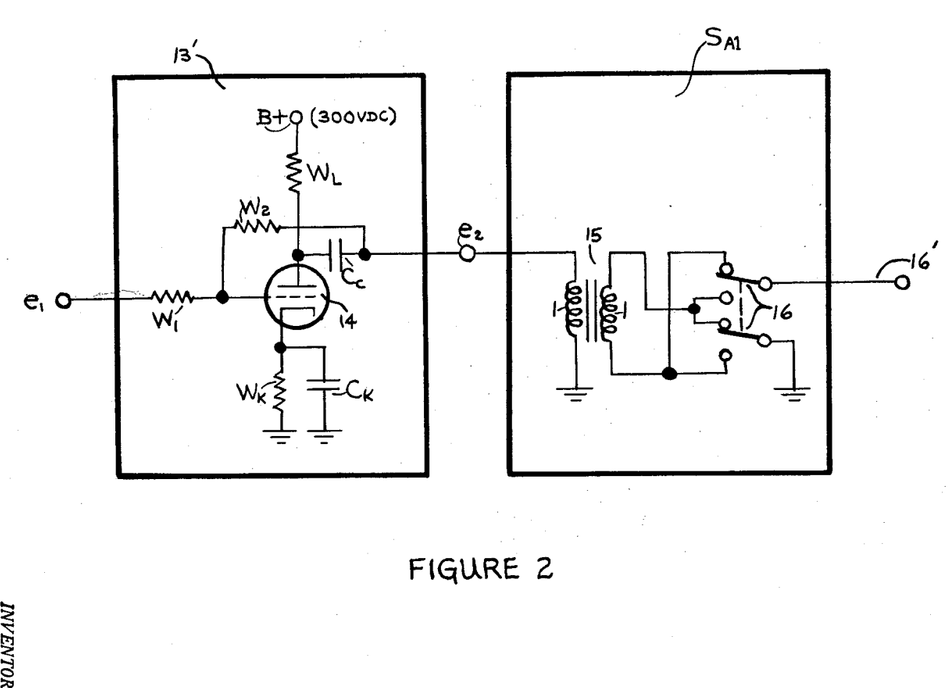
FIG. 2 is a partial diagram illustrating in more detail certain components of the arrangement according to FIG. 1.

Referring now to FIG. 2, certain details of the intermediate means interposed between consecutive resolvers and of the reversing switches are described in more detail. The intermediate means may be properly termed buffer amplifiers or impedance isolation means, or also impedance transformers. A buffer amplifier of this type, e.g. the amplifier 13′, is essentially conventional and is a triode amplifier with two resistors $W_1$ and $W_2$ which control the gain from input to output of this amplifier, i.e. the relationship between an arbitrary input voltage $e_1$ to the output voltage $e_2$. The ratio between the voltages $e_2$ and $e_1$ is approximately the same as the ratio between the resistances $W_2$ and $W_1$. The other resistances $W_L$ and $W_k$ together with the capacitors $C_c$ and $C_k$ are standard components of amplifier circuits of this type and are not critical. The triode 14 used in this amplifier may be of the commercial type #5687 which has been found to operate satisfactorily for the present purpose.

FIG. 2 also shows in greater detail, by way of example, the reversing switch $S_{A1}$ connected with the buffer amplifier 13′. The purpose of any one of these reversing or selector switches is to reverse the phase of the particular harmonic term supplied from the associated buffer amplifier, by 180°, as stated above. As can be seen, the switch $S_{A1}$ comprises essentially a 1:1 transformer 15 and a double-pole double-throw switch 16. The primary winding of transformer 15 is connected at one end to the output of the amplifier 13′ and with the other end to ground. The secondary winding is connected, as shown, to the alternative stationary terminals of the switch 16 while the moving arms of this switch are so connected that in one position of the switch, as illustrated, one end of the secondary winding is connected to ground and the other one to the output terminal 16′ of the switch $S_{A1}$, while in the other position of the switch 16 the connections of the secondary winding with ground and output terminal 16′ are reversed.

It may be mentioned that the above-mentioned tube type 5687 is actually a double triode which permits the combination of the amplifiers 13 and 13′ into one unit, using the double triode and duplicating the other circuit components. A triode of this type has all the necessary electrical characteristics, as for instance the power rating that would be suitable for operating in connection with the types of resolvers that are suitable for the apparatus described above.

It is highly advisable to drive resolvers of the type contemplated by a low impedance source as furnished by an amplifier as described. In this manner difficulties that otherwise might arise are satisfactorily avoided.

It can now be seen that the U ratio $W_2:W_1$ can be adjusted in such a manner that unity gain is assured all along the whole series of resolvers. Of course, this adjustment of the just-mentioned ratio depends entirely on the characteristics and type of the resolvers used in a particular setup and cannot be predicted. However, there is no difficulty in adjusting or selecting the resistors to suit the purpose.

Referring again to FIG. 1, it can be seen that from every one of the above-mentioned potentiometers $P_{A1}$, $P_{B1}$, $P_{A2}$, $P_{B2}$, etc. a line 17 leads to an associated resistor, the group of these resistors being labelled Summing Resistors, the other ends of these Summing Resistors being all connected to one output line 18. In this manner, the modulated output voltages of every one of the various resolver stages are added up to one composite modulated complex wave in the line 18 from which this wave is passed through the summing amplifier 12 and from there to the phase-sensitive demodulator 19 which serves also as output stage. In addition to the just-mentioned various output voltages, the unmodulated carrier voltage $v_3 = v_3 \sin(\omega_c t + \phi_c)$ adjusted in magnitude by a potentiometer $P_{Ao}$, is also introduced through a resistor of the same type as the other Summing Resistors, to the common line 18. The addition of this unmodulated carrier wave constitutes the Fourier component $A_o$, or in other words, the average value of the desired waveform. The polarity of the introduced carrier voltage is selected in the same manner as in the case of the other terms by a reversing switch as shown. A reference voltage is supplied to the demodulator 19 in the form $v_4 = v_4 \sin(\omega_c t + \phi_c)$, in other words, in phase with both $V_2$ and $V_3$.

Figure 3:
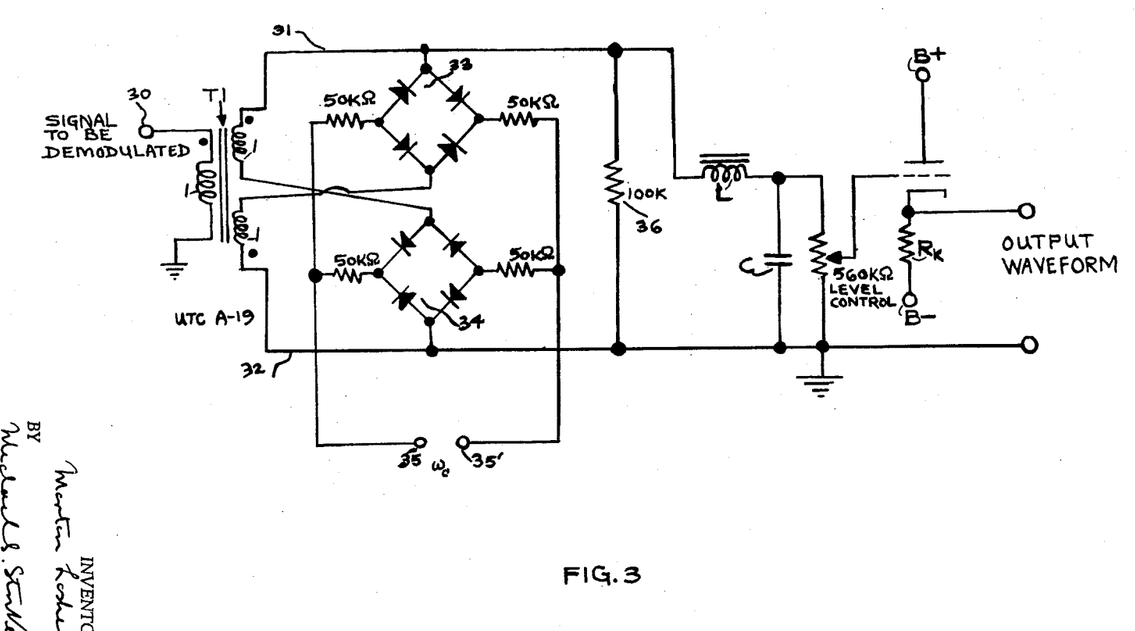
FIG. 3 is another partial diagram illustrating another component of the circuit of FIG. 1.

Referring now to FIG. 3, details of a typical full-wave demodulator, as indicated at 19 in FIG. 1, are shown. A commercial type of this device is known as UTC A-19. It comprises a split secondary transformer $T_1$. Its primary winding is connected between input terminal 30 and ground, while its secondary windings are each connected at one end to one of the output lines 31, 32, respectively, and at the other end to one terminal of an associated bridge-type rectifier circuit 33, 34, respectively, which act as diode switches, the opposite terminal of each circuit 33, 34, respectively, being connected to the associated line 31, 32. The other diagonally opposed terminals of the circuits 33, 34 are connected respectively in parallel, as shown, to input terminals 35, 35′, respectively, to which the unmodulated carrier frequency $\omega_c$, e.g., 2 kc. at 70 volts, is applied. This voltage has to be isolated from ground which can be achieved through a transformer, not shown. Across the output lines 31, 32 is connected a load resistor 36, preferably in the magnitude of 100KΩ, and a filter LC is connected to lines 31, 32 which tends to bypass the rectified carrier frequency so as to leave only the envelope of the demodulated signal. It can be seen that the just-described arrangement acts as a switching means for alternatingly switching the output of the secondary windings of transformer $T_1$ across the load in synchronism with the carrier frequency underneath the signal so that the effect is that of a full-wave rectifier. However, it is phase-sensitive to that as the signal which is impressed or the carrier reverses its polarity, the carrier wave also reverses by 180° and the signal delivered by this demodulator also reverses its polarity. In this manner this arrangement operates as a full-wave demodulator in a manner known per se.

It is evidently important to maintain the velocity of the shaft 10 at a chosen or required value $\omega$ although the velocity should be variable over a wide range for practical purposes. At any one setting, the velocity $\omega$ can be held constant to within 1% which is accomplished by a high performance tachometer servo-loop as shown in FIG. 1. As can be seen from the diagram of FIG. 1, the generator G derives a signal voltage proportional to the actual shaft velocity $\omega$, and this signal is compared with a signal derived from the frequency control potentiometer $P_1$. The difference between these signals is used as an error signal in conventional manner for correcting the speed of the motor M until the error is reduced to substantially zero. By using conventional compensation techniques within the servo-loop, it is possible to control the motor speed to the above-mentioned accuracy.

If, in the arrangement of FIG. 1A, the potentiometer $P_3$ is adjusted with its tapping point positioned away from the ground end and $e_{in}$ is permitted to be a signal which linearly increases from a magnitude of zero at a uniform rate at a time $t$ of application to said potentiometer, the shaft 40 would turn at a uniform angular rate and would, in effect, establish a constant angular velocity $\omega$ and the output waveform of the arrangement would be repetitive in nature with a periodicity of $$\frac{2\pi}{\omega}$$

Or, if the input voltage $v_5$ has a magnitude of zero, the arrangements of FIGS. 1 and 1A are identical due to the fact that in the absence of a position feedback signal the position control servo-loop of FIG. 1A becomes the velocity control servo-loop of FIG. 1.

The basic structure of the device according to the invention as illustrated by FIGS. 1 and 1A possesses a great versatility permitting certain modifications or simplifications of the operation if a specific type of complex waveform is desired. For instance, if one were interested in waveforms containing only odd harmonics (square wave types) it is apparent that every second resolver (of FIG. 1) would remain unused as far as its output is concerned. In such a case, the output voltages of the "unused" resolvers can easily be prevented from entering the summing amplifier 12 by simply setting the corresponding potentiometers for instance $P_{A2}$, $P_{B2}$, $P_{A4}$, $P_{B4}$, etc., to the grounded end. On the other hand, the shaft 10 may be divided into sections interconnected by gear means $G_1$, $G_2$, $G_3$ ... $G_{n-1}$. The gear ratio in these gear means may be fixed or preferably variable. It can be seen that if, for instance, the first gear means $G_1$ between the resolvers R1 and R2 is set to a ratio of 1:2 while all the other gear means are set to a ratio of 1:1 then the first resolver R1 would generate output voltages containing the factor sin $\omega t$ and cos $\omega t$ as before while the second resolver R2 would generate voltages containing sin $3\omega t$ and cos $3\omega t$, the third resolver R3 would generate voltages containing sin $5\omega t$ and cos $5\omega t$, etc. so that the whole series of resolvers would generate only the odd harmonics. Similarly, if waveforms containing only even harmonics are desired, only the gear means $G_2$ would be set to a ratio of 1:2 while all the other gear means would remain at a ratio of 1:1. In this instance, the output of the first resolver R1 would contain sin $\omega t$ and cos $\omega t$, the output of the second resolver R2 would contain sin $2\omega t$ and cos $2\omega t$, that of the third resolver R3 sin $4\omega t$ and cos $4\omega t$, that of the fourth resolver R4 sin $6\omega t$ and cos $6\omega t$, etc. Of course, if only one particular set of harmonics is desired for any operation of the device, then of course the total number of resolvers in the series could be reduced and the gears be set to, or provided for, the desired ratio for obtaining only odd harmonics or only even harmonics, as the case may be, permanently.

It is obvious that any combination of ratios of the various gear means coupling the drive shaft between the resolvers may be utilized to provide a desired combination of output waveforms. Thus, for example, when one gear means is set at a 1:2 ratio another gear means may be set at a 3:1 ratio and so on, in order to provide a desired output function. If, for example, the gear ratio of the gear means $G_1$ of FIG. 1 is set at 2:1 and the gear ratio of the gear means $G_2$ is set at 1:1, the output of the first resolver R1 would contain sin $\omega t$ and cos $\omega t$ and the output of the second resolver R2 would contain $$\sin \frac{3\omega}{2}t \text{ and } \cos \frac{3\omega}{2}t$$

the output of the third resolver R3 containing $$\sin \frac{4\omega}{2}t \text{ and } \cos \frac{4\omega}{2}t$$

if the gear ratio of the gear means $G_3$ were 1:1.

The output waveforms of the arrangement of FIG. 1A may be varied as desired in the aforementioned manner, aside from variation of the angular position $\phi$ of the drive shaft, by variation of the gear ratios of the various gear means $G_1$, $G_2$, $G_3$ ... $G$. Any combination of ratios of the various gear means may be utilized to provide a desired combination of output waveforms, the output waveforms containing the functions sin $zm\phi$ and cos $zm\phi$, where the values of $zm$ will vary with variation of the gear ratios.

The use of the apparatus according to the invention for generating related frequencies may be extended one further step. Complete generality results from the fact that the mechanical coupling with different types of gears or by using different gear ratios, will permit the production of any frequency relationship between the individual resolver outputs, depending only on the type of coupling or gear ratio used. The use of normal spur or bevel gears would establish frequency relationships of rational fraction values $m:n$ wherein $m$ and $n$ are both integers in accordance with the integral number of teeth of such gears. If variable gears, or, for instance, a belt drive, is used, obviously irrational relationships may be established as well. However, it has to be borne in mind that the electrical interconnections between the rotors of the individual resolvers and the stators of the next resolver also determine the frequency relationships that may be established.

It will be understood that each of the elements described above, or two or more together, may also find a useful application in other types of method and apparatus for generating repetitive waveforms differing from the types described above.

While the invention has been illustrated and described as embodied in method and apparatus for generating complex repetitive waveforms in accordance with Fourier series determination, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Apparatus for generating low frequency complex repetitive waveforms, comprising, in combination, first resolver means being capable of resolving an input carrier votlage of the sinusoidal form $v=v$ sin $(\omega_c t+\phi_c)$ into output voltages $kv$ sin $\theta$ and $kv$ cos $\theta$, wherein $k$ is the transformation ratio of said resolver means; $n-1$ resolver means operatively connected in series with said first resolver means, $n$ being an integer at least equal to 2; means for introducing into each of said first and $n-1$ resolver means a predetermined constant modulation frequency $m\omega$, $m$ being a positive number, in such a manner that the output voltages of said $n-1$ resolver means are modulated each to the form $kv$ sin $(zm\omega t+\phi)$ and $kv$ cos $(zm\omega t+\phi)$, respectively, wherein $z$ changes between consecutive resolver means by integers between 2 and $n$, $\phi$ being an arbitrary phase angle; intermediate means interposed between said first resolver means and the first one of said $n-1$ resolver means, as well as between each two consecutive ones of said $n-1$ resolver means, respectively, for transmitting said output voltages respectively from one resolver means to the next following one, and including output means; summing means connected to said output means of said intermediate means for summing up a desired number of the modulated output voltages obtained from a corresponding number of said resolver means through the output means of the respective intermediate means, and for adding thereto said unmodulated input carrier voltage so as to obtain a complex repetitive modulated waveform; and demodulator means connected to said summing means for demodulating said complex repetitive waveform so as to obtain a demodulated wave containing the desired number of harmonics.

2. Apparatus for generating low frequency complex repetitive waveforms, comprising, in combination, first resolver means having at least one rotor and two stators and being capable of resolving an input carrier voltage of the sinusoidal form $v=v$ sin $(\omega_c t+\phi_c)$ into output voltages $kv$ sin $\theta$ and $kv$ cos $\theta$, wherein $k$ is the transformation ratio of said resolver means; $n-1$ resolver means having two rotors and two stators and being operatively connected in series with said first resolver means, $n$ being an integer at least equal to 2; rotary drive means rotatable at a contastnt rotational speed $\omega$ and capable of causing rotation of said rotors of said resolver means for introducing into each of said first and $n-1$ resolver means a predetermined constant modulation frequency $m\omega$, $m$ being a positive number, in such a manner that the output voltages of said $n-1$ resolver means are modulated each to the form $kv \sin (zm\omega t+\phi)$ and $kv \cos (zm\omega t+\phi)$, respectively, wherein $z$ changes between consecutive resolver means by integers between 2 and $n$, $\phi$ being an arbitrary phase angle; intermediate means interposed between said first resolver means and the first one of said $n-1$ resolver means, as well as between each two consecutive ones of said $n-1$ resolver means, respectively, for transmitting said output voltages respectively from one resolver means to the next following one, and including output means; summing means connected to said output means of said intermediate means for summing up a desired number of the modulated output voltages obtained from a corresponding number of said resolver means through the output means of the respective intermediate means, and for adding thereto said unmodulated input carrier voltage so as to obtain a complex repetitive modulated waveform; and demodulator means connected to said summing means for demodulating said complex repetitive modulated waveform so as to obtain a demodulated wave containing the desired number of harmonics.

3. Apparatus for generating low frequency complex repetitive waveforms, comprising, in combination, first resolver means having at least one rotor and two stators and being capable of resolving an input carrier voltage of the sinusoidal form $v=v \sin (\omega_c t+\phi_c)$ into output voltages $kv \sin \phi$ and $kv \cos \phi$, wherein $k$ is the transformation ratio of said resolver means; $n-1$ resolver means having two rotors and two stators and being operatively connected in series with said first resolver means, $n$ being an integer at least equal to 2; rotary drive means including shaft means operatively connected with all of said rotors and being rotatable at a constant rotational speed $\omega$ and capable of causing rotation of said rotors of said resolver means for introducing into each of said first and $n-1$ resolver means a predetermined constant modulation frequency $m\omega$, $m$ being a positive number, in such a manner that the output voltages of said $n-1$ resolver means are modulated each to the form $kv \sin (zm\omega t+\phi)$ and $kv \cos (zm\omega t+\phi)$, respectively, wherein $z$ changes between consecutive resolver means by integers between 2 and $n$, $\phi$ being an arbitrary phase angle; intermediate means interposed between said first resolver means and the first one of said $n-1$ resolver means, as well as between each two consecutive ones of said $n-1$ resolver means, respectively, for transmitting said output voltages respectively from one resolver means to the next following one, and including output means; summing means connected to said output means of said intermediate means for summing up a desired number of the modulated output voltages obtained from a corresponding number of said resolver means through the output means of the respective intermediate means, and for adding thereto said unmodulated input carrier voltage so as to obtain a complex repetitive modulated waveform; and demodulator means connected to said summing means for demodulating said complex repetitive modulated waveform so as to obtain a demodulated wave containing the desired number of harmonics.

4. Apparatus for generating low frequency complex repetitive waveforms, comprising, in combination, first resolver means having at least one rotor and two stators and being capable of resolving an input carrier voltage of the sinusoidal form $v=v \sin (\omega_c t+\phi_c)$ into output voltages $kv \sin \theta$ and $kv \cos \theta$, wherein $k$ is the transformation ratio of said resolver means; $n-1$ resolver means having two rotors and two stators and being operatively connected in series with said first resolver means, $n$ being an integer at least equal to 2; rotary drive means including shaft means comprising shaft sections respectively associated with individual resolver rotors, and gear means interconnecting said shaft sections and operatively connected with all of said rotors and being rotatable at a constant rotational speed and capable of causing rotation of said rotors of said resolver means at speeds $m\omega$ depending on the gear ratio of said gear means for introducing into each of said first and $n-1$ resolver means a predetermined constant modulation frequency $m\omega$, $m$ being a positive number, in such a manner that the output voltages of said $n-1$ resolver means are modulated each to the form $kv \sin (zm\omega t+\phi)$ and $kv \cos (zm\omega t+\phi)$, respectively, wherein $z$ changes between consecutive resolver means by integers between 2 and $n$, $\phi$ being an arbitrary phase angle; intermediate means interposed between said first resolver means and the first one of said $n-1$ resolver means, as well as between each two consecutive ones of said $n-1$ resolver means, respectively, for transmitting said output voltages respectively from one resolver means to the next following one, and including output means; summing means connected to said output means of said intermediate means for summing up a desired number of the modulated output voltages obtained from a corresponding number of said resolver means through the output means of the respective intermediate means, and for adding thereto said unmodulated input carrier voltage so as to obtain a complex repetitive modulated waveform; and demodulator means connected to said summing means for demodulating said complex repetitive modulated waveform so as to obtain a demodulated wave containing the desired number of harmonics.

5. In apparatus for generating low frequency complex repetitive waveforms, in combination, first resolver means having at least one rotor and two stators and being capable of resolving an input carrier voltage of the sinusoidal form $v=v \sin (\omega_c t+\phi_c)$ into output voltages $kv \sin \theta$ and $kv \cos \theta$, wherein $k$ is the transformation ratio of said resolver means; $n-1$ resolver means having two rotors and two stators and being operatively connected in series with said first resolver means, $n$ being an integer at least equal to 2; rotary drive means including shaft means comprising shaft sections respectively associated with individual resolver rotors, and gear means interconnecting said shaft sections and operatively connected with all of said rotors and being rotatable at a constant rotational speed and capable of causing rotation of said rotors of said resolver means at speeds $m\omega$ depending on the gear ratio of said gear means for introducing into each of said first and $n-1$ resolver means a predetermined constant modulation frequency $m\omega$, $m$ being a positive number, in such a manner that the output voltages of said $n-1$ resolver means are modulated each to the form $$kv \sin (zm\omega t+\phi)$$

and $kv \cos (zm\omega t+\phi)$, respectively, wherein $z$ changes between consecutive resolver means by integers between 2 and $n$, $\phi$ being an arbitrary phase angle; intermediate buffer amplifier means interposed between said first resolver means and the first one of said $n-1$ resolver means, as well as between each two consecutive ones of said $n-1$ resolver means, respectively, for transmitting said output voltages respectively from one resolver means to the next following one, and including output means comprising phase reversing means for changing the phase of said output voltages, and potentiometer means for adjusting the respective amplitudes of said output voltages.

6. Apparatus as claimed in claim 5, including servo-loop means operatively connected with said shaft means for keeping a predetermined rotational speed thereof at a substantially constant value.

7. Apparatus for use in generating complex waveforms as a function of an independent variable, comprising, in combination, first resolver means having at least one rotor and two stators and being capable of resolving an input carrier voltage of the sinusoidal form $v=v \sin (\omega_c t+\phi_c)$ into output voltages $kv \sin \theta$ and $kv \cos \theta$, wherein $k$ is the transformation ratio of said resolver means; $n-1$ resolver means having two rotors and two stators and being operatively connected in series with said first resolver means, $n$ being an integer at least equal to 2; rotary drive means including shaft means operatively connected with all of said rotors and being capable of causing positioning of said rotors of said resolver means for introducing into each of said first and $n-1$ resolver means a predetermined angular position $m\phi$ as a function of an independent variable, $m$ being a positive number, in such a manner that the output voltages of said $n-1$ resolver means are modulated each to the form $k\nu \sin(zm\phi)$ and $k\nu \cos(zm\phi)$, respectively, wherein $z$ changes between consecutive resolver means by integers between 2 and $n$, $\phi$ being the angular position of said first resolver means; intermediate means interposed between said first resolver means and the first one of said $n-1$ resolver means, as well as between each two consecutive ones of said $n-1$ resolver means, respectively, for transmitting said output voltages respectively from one resolver means to the next following one, and including output means whereby said output means of said intermediate means is adapted to be connected to summing means for summing up a desired number of the modulated output voltages obtained from a corresponding number of said resolver means through the output means of the respective intermediate means, and for adding thereto said unmodulated input carrier voltage so as to obtain a complex modulated waveform, said summing means being adapted to be connected to demodulating means for demodulating said complex modulated waveform so as to obtain a demodulated wave having the desired waveform.

8. Apparatus for use in generating complex waveforms, as a function of an independent variable, comprising, in combination, first resolver means having at least one rotor and two stators and being capable of resolving an input carrier voltage of the sinusoidal form $$v = v \sin(\omega_c t + \phi_c)$$

into output voltages $k\nu \sin \theta$ and $k\nu \cos \theta$, wherein $k$ is the transformation ratio of said resolver means; $n-1$ resolver means having two rotors and two stators and being operatively connected in series with said first resolver means, $n$ being an integer at least equal to 2; rotary drive means including shaft means comprising shaft sections respectively associated with individual resolver rotors, and gear means interconnecting said shaft sections and operatively connected with all of said rotors and being capable of causing positioning of said rotors of said resolver means at angular positions $m\phi$ depending on the gear ratio of said gear means for introducing into each of said first and $n-1$ resolver means a predetermined angular position $m\phi$ as a function of an independent variable, $m$ being a positive number, in such a manner that the output voltages of said $n-1$ resolver means are modulated each to the form $k\nu \sin(zm\phi)$ and $k\nu \cos(zm\phi)$, respectively, wherein $z$ changes between consecutive resolver means by integers between 2 and $n$, $\phi$ being the angular position of said first resolver means; intermediate means interposed between said first resolver means and the first one of said $n-1$ resolver means, as well as between each two consecutive ones of said $n-1$ resolver means, respectively, for transmitting said output voltages respectively from one resolver means to the next following one, and including output means whereby said output means of said intermediate means is adapted to be connected to summing means for summing up a desired number of the modulated output voltages obtained from a corresponding number of said resolver means through the output means of the respective intermediate means, and for adding thereto said unmodulated input carrier voltage so as to obtain a complex modulated waveform, said summing means being adapted to be connected to demodulating means for demodulating said complex modulated waveform so as to obtain a demodulated wave having the desired waveform.

9. Apparatus for use in generating complex waveforms as a function of an independent variable, comprising, in combination, first resolver means having at least one rotor and two stators and being capable of resolving an input carrier voltage of the sinusoidal form $$v = v \sin(\omega_c t + \phi_c)$$

into output voltages $k\nu \sin \theta$ and $k\nu \cos \theta$, wherein $k$ is the transformation ratio of said resolver means; $n-1$ resolver means having two rotors and two stators and being operatively connected in series with said first resolver means, $n$ being an integer at least equal to 2; rotary drive means including shaft means comprising shaft sections respectively associated with individual resolver rotors, and gear means interconnecting said shaft sections and operatively connected with all of said rotors and being capable of causing positioning of said rotors of said resolver means at angular positions $m\phi$ depending on the gear ratio of said gear means for introducing into each of said first and $n-1$ resolver means a predetermined angular position $m\phi$ as a function of an independent variable, $m$ being a positive number, in such a manner that the output voltages of said $n-1$ resolver means are modulated each to the form $k\nu \sin(zm\phi)$ and $k\nu \cos(zm\phi)$, respectively, wherein $z$ changes between consecutive resolver means by integers between 2 and $n$, $\phi$ being the angular position of said first resolver means; intermediate buffer amplifier means interposed between said first resolver means and the first one of said $n-1$ resolver means, as well as between each two consecutive ones of said $n-1$ resolver means, respectively, for transmitting said output voltages respectively from one resolver means to the next following one, and including output means comprising phase reversing means for changing the phase of said output voltages, and potentiometer means for adjusting the respective amplitudes of said output voltages whereby said output means of said intermediate means is adapted to be connected to summing means for summing up a desired number of the modulated output voltages obtained from a corresponding number of said resolver means through the output means of the respective intermediate means, and for adding thereto said unmodulated input carrier voltage so as to obtain a complex modulated waveform, said summing means being adapted to be connected to demodulating means for demodulating said complex modulated waveform so as to obtain a demodulated wave having the desired waveform.

10. Apparatus as claimed in claim 9, including servo-loop means operatively connected with said shaft means capable of causing a predetermined angular position thereof as a function of an independent variable.

References Cited in the file of this patent

UNITED STATES PATENTS

| | | |
|---|---|---|
| 2,428,800 | Holden | Oct. 14, 1947 |
| 2,858,981 | Goldman | Nov. 4, 1958 |
| 2,963,224 | McDonough | Dec. 6, 1960 |
| 2,967,020 | Isley | Jan. 3, 1961 |